United States Patent [19]

Landon

[11] Patent Number: 5,213,243
[45] Date of Patent: May 25, 1993

[54] AUTOMOBILE TISSUE DISPENSER

[76] Inventor: Kimberly A. B. Landon, 407 Overbrook Rd., Baltimore, Md. 21212

[21] Appl. No.: 745,356

[22] Filed: Aug. 15, 1991

[51] Int. Cl.$^5$ .............................................. B60R 7/00
[52] U.S. Cl. ................................... 224/277; 224/311; 224/42.42; 206/233; 296/37.8; 296/37.12; 296/37.13; D12/190
[58] Field of Search ............... 224/277, 279, 282, 311, 224/312, 42.42 R; 206/233; 248/311.2, 311.3, 905; 312/242, 237, 245, 246, 248; 221/33, 45, 46; 296/37.1, 37.8, 37.12, 37.13; D6/519; D12/190; 280/727

[56] References Cited

U.S. PATENT DOCUMENTS

| | | | |
|---|---|---|---|
| D. 158,485 | 5/1950 | Manetti | D6/518 |
| D. 167,890 | 10/1952 | Hallward | D6/518 |
| D. 201,704 | 7/1965 | Howard | D6/518 |
| D. 202,385 | 9/1965 | Wilson | D6/519 |
| D. 205,637 | 8/1966 | Wilson | D6/519 |
| D. 206,354 | 11/1966 | Larkin | D6/519 |
| D. 207,071 | 2/1967 | Larkin | D6/519 |
| D. 248,847 | 8/1978 | Wooters | D12/191 |
| D. 272,059 | 1/1984 | Bell et.al. | D12/191 |
| D. 281,413 | 11/1985 | Prince Corporation et al. | D12/191 |
| D. 309,595 | 7/1990 | Jonsas | D12/191 |
| 2,223,094 | 11/1940 | Burnette | 221/46 |
| 2,263,956 | 11/1941 | Russell | 248/311.2 |
| 2,278,011 | 3/1942 | Murdock | 296/97.5 |
| 2,300,692 | 11/1942 | Olsen | 248/311.2 |
| 2,504,515 | 4/1950 | Gantner et al. | 221/46 |
| 2,673,056 | 3/1954 | Manetti | 248/311.2 |
| 2,738,942 | 3/1956 | Gantner | 248/289.1 |
| 2,882,113 | 4/1959 | Gantner | 312/248 |
| 2,887,216 | 5/1959 | Hargraves | 224/277 |
| 2,958,496 | 11/1960 | Johnson | 248/225.2 |
| 3,214,059 | 10/1965 | Stark | 221/46 |
| 3,223,281 | 12/1965 | Larkin | 224/42.42 R X |
| 3,285,398 | 11/1966 | Larkin | 224/42.42 R |
| 3,409,193 | 11/1968 | Metcalf | 224/42.42 R X |
| 3,414,157 | 12/1968 | Wright | 224/42.42 R X |
| 3,561,589 | 2/1971 | Larkin | 224/277 X |
| 3,630,343 | 12/1971 | Wohl | 224/277 |
| 3,773,378 | 11/1973 | Lewis | 224/311 |
| 3,870,210 | 3/1975 | Trammell, Jr. | 224/277 X |
| 4,131,298 | 12/1978 | Douglas | 280/727 |
| 4,300,709 | 11/1981 | Page | 224/42.42 X |
| 4,445,720 | 5/1984 | Leaf et al. | 224/42.42 X |
| 4,967,988 | 11/1990 | Nguyen | 248/905 X |
| 5,007,610 | 4/1991 | Christiansen et al. | 248/311.2 |
| 5,050,922 | 9/1991 | Falcoff | 296/37.8 X |
| 5,062,559 | 11/1991 | Falcott | 224/311 |
| 5,123,566 | 6/1992 | Lage et al. | 221/46 |

FOREIGN PATENT DOCUMENTS

| | | | |
|---|---|---|---|
| 126362 | 11/1984 | European Pat. Off. | 206/233 |
| 3505409 | 8/1986 | Fed. Rep. of Germany | 224/42.42 |
| 78838 | 5/1983 | Japan | 224/42.42 |
| 118431 | 7/1983 | Japan | 224/42.42 |
| 61-24642 | 2/1986 | Japan | 224/42.42 |
| 90/02061 | 3/1990 | PCT Int'l Appl. | 224/277 |
| 2162134 | 1/1986 | United Kingdom | 224/42.42 |

OTHER PUBLICATIONS

J.C. Whitney & Co. Parts & Accessories Catalog, 1989, p. 273 "Custon-Fit Center Consoles".

*Primary Examiner*—Henry J. Recla
*Assistant Examiner*—Glenn T. Barrett
*Attorney, Agent, or Firm*—Karen Lee Orzechowski

[57] ABSTRACT

A tissue dispenser for a motor vehicle which is molded as an integral part of the interior trim of a motor vehicle in such a manner that no additional hardware is needed. The tissue dispenser is preferably located in a readily accessible location in the interior of the motor vehicle—such as the dashboard, the passenger rear seat arm rest compartment, the center console, the overhead console, or the door. The tissue dispenser may be color blended to match the interior trim or may be covered with fabric to match the upholstery.

7 Claims, 3 Drawing Sheets

AUTOMOBILE TISSUE DISPENSER

FIELD OF THE INVENTION

The present invention relates to a factory installed tissue dispenser, and more particularly to an integral molded dispenser for a motor vehicle.

BACKGROUND OF THE INVENTION

Although facial tissues are quite useful and a great convenience when travelling in a motor vehicle, ordinarily they must be stored in generally inconvenient places in the vehicle and are not readily within reach when needed.

Prior attempts have been made to supply after-market attachments for holding boxes of facial tissue in the automobile. However, the location of these after-market devices has generally not been convenient. Furthermore, these after-market devices have had the problems of assembly of the dispenser, mounting the dispenser, and the cost. Oftentimes, the installation of these after-market devices causes permanent damage to the interior of an automobile that leaves an unsightly scar if these devices are later removed. In addition, such after-market devices are often very unsightly.

One such after-market device is described in U.S. Pat. No. 2,300,692 to Olsen. This device is designed to be attached to the fabric of an automobile interior or upholstered furniture. The holder portion of the dispenser consists of a metal frame. The dispenser is attached to the fabric by means of anchoring prongs that are inserted into the fabric. A complex lever system is then used to secure the anchoring prongs. This type of device is not only unsightly, it is also very damaging to the surface to which it is being mounted.

Another type of prior art after-market is shown in U.S. Pat. No. 2,504,515 to Gantner et al., which discloses a two piece molded tissue dispenser top. The supporting member piece is affixed to the mounting surface, i.e. the side wall of an automobile in front of the cowl, by screws or other fastening means. The dispenser container has an open back so that the box of tissues may be placed therein and a slotted front so that tissues may withdrawn. These two pieces are attached together by means of metal hardware and hinges.

However, no one has developed a simple, attractive, readily accessible tissue dispenser for a motor vehicle that is installed at the factory and that is an integral part of the motor vehicle interior trim.

SUMMARY OF THE INVENTION

The present invention is directed to a factory installed tissue dispenser for a motor vehicle in which the dispenser is an integral part of the motor vehicle. The tissue dispenser is molded at the same time as the interior trim of a motor vehicle is, and forms an integral part of that piece of interior trim.

In making the interior trim, the mold includes the form for the tissue dispenser. The tissue dispenser is molded in such a manner that no additional hardware is needed, either metal or plastic.

In a preferred embodiment, the tissue dispenser is located in a readily accessible location in the interior of the motor vehicle—such as the dashboard, the passenger rear seat arm rest compartment, the center console, the overhead console, or the door.

In another embodiment of the present invention, the tissue dispenser matches the motor vehicle interior. The tissue dispenser may be color blended to match the interior trim or may be covered with fabric to match the upholstery.

BRIEF DESCRIPTION OF THE DRAWINGS

The invention is further described by way of illustrative examples with reference to the drawings, in which.

Figure 1:
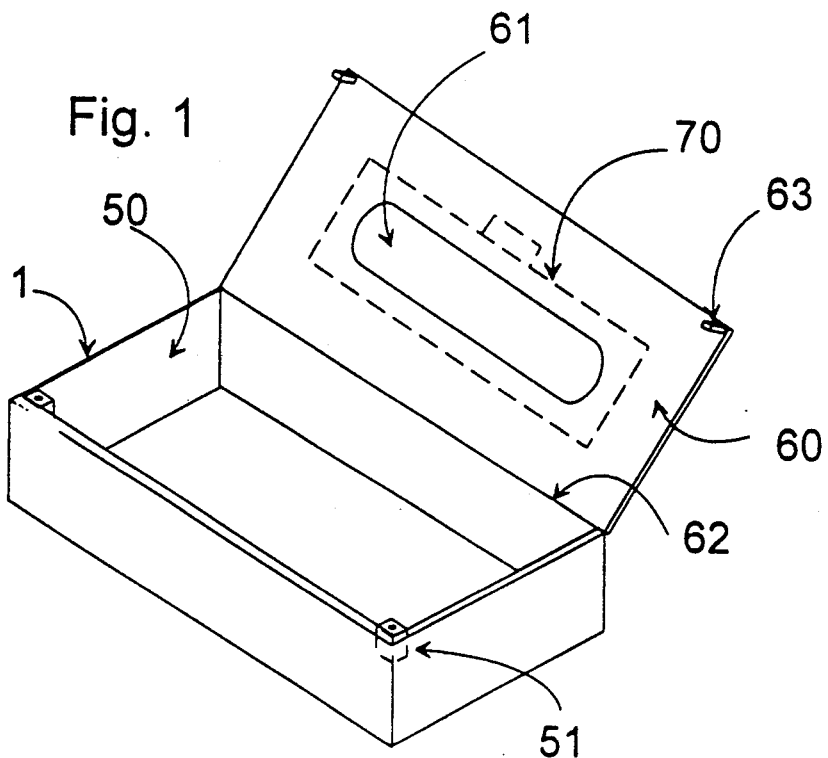
FIG. 1 is a perspective view showing the operation of the motor vehicle tissue dispenser of the present invention wherein the tissue dispenser is integrally molded with an automotive interior trim piece so as to form an integral portion of the interior trim piece.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

DETAILED DESCRIPTION OF THE INVENTION

An embodiment of the present invention will now be described, by way of example only, referring to the drawings.

Referring to FIG. 1, there is shown the tissue dispenser of the present invention, generally indicated as 1. The tissue dispenser 1 allows a box of cleansing tissue to be placed in a motor vehicle within convenient reach of the driver and/or the passengers.

The tissue dispenser 1 is an integral portion of the motor vehicle interior trim 10 and is formed at the same time in the same molding operation. The tissue dispenser 1 is preferably fabricated from the same plastic or other type material as the interior trim 10 by any well known fabrication process such as injection molding.

The tissue dispenser 1 has a box-like container portion 50 for containing the tissues to be dispensed. The container portion 50 is of the size and shape to hold tissues.

Preferably, the tissues are in the form of a standard commercially available package. These tissue packages that are generally consist of a substantially rectangular cardboard or flexible plastic film box having a slotted opening in its top wall through which individual tissue sheets are successively pulled out.

However, the specific shape of the tissue dispenser 1 may be varied to accommodate sheets contained in packages which may be substantially square or of another shape. In such event, it will only be necessary to change the over-all dimensions of the device as a whole without altering the structural characteristics thereof.

The container portion 50 is recessed with respect to the front face of interior trim 10. One edge of container portion 50 has a clasping or gripping member 51 also integrally molded with the interior trim 10 containing container portion 50. The clasping member 51 is preferably molded in a manner that permits it to be releasably secured to container portion 50. One such means for achieving this is to use a molded peg that can be received into a slot and rereleased for repeated openings and closures.

The retainer flap 60 is used to releasably secure the tissue package in place in container portion 50 during the dispensing operation. The retainer flap 60 has a opening 61 for dispensing the tissues. The opening 61 may be of any shape which enables the tissues to be singly dispensed. In a preferred embodiment, the opening 61 is of an oval or slotted shape.

The retainer flap 60 is attached to the container portion 50 by means of the flange 62. The free end of the retainer flap 60 has a clasping member 63 which is releasably clasped by clasping member 51 of container portion 50.

In another embodiment of the present invention, the tissue dispenser 1 further comprises a cover flap 70. The cover flap 70 is attached to container portion 60 by means of flange 71. The free end of cover flap has a clasping member 72 that operates by means of an internal magnet that when closed lays flatly against the surface of container portion 60.

To load the tissue into tissue dispenser 1, retaining flap 60 is opened by unclasping clasping members 63 and 51, and rotating the free end of retaining flap 60 around flange 62 away from interior trim 10 and container portion 50. This results in container portion 50 being accessible and ready to receive the tissues to be loaded into tissue dispenser 1.

To ready tissue dispenser 1 for the dispensing operation, one merely reverses the above operation to first close and secure the retaining flap 60. At this point, preferably the first tissue is grasped through the retainer opening 61 by the fingertips and pulled through retainer opening 61 to start the dispensing operation. The cover flap 70 is then closed and secured so that the tissue dispenser 1 will be ready for its next dispensing operation.

In operation, the cover flap 70 is opened, as described above, exposing the topmost tissue. The exposed tissue is then grasped by the fingertips and pulled through retainer opening 61 until it is released. This results in the next tissue becoming exposed and ready for dispensing.

At this point, either another tissue may be dispensed or the cover flap 70 may be closed and secured the internal magnet to protect the supply of tissues and conceal the tissue so as not to present an unsightly appearance.

The tissue dispenser 1 may be formed in any piece of molded interior trim of sufficient size and is preferably placed in a location convenient to either the driver or the passengers, or both.

Figure 2A:
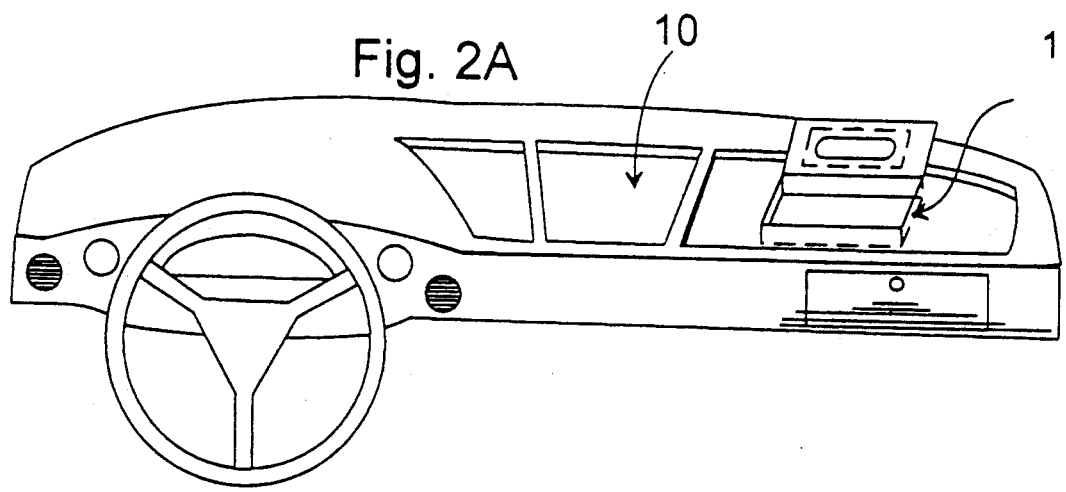
FIG. 2A is a perspective view showing the tissue dispenser of the present invention located in the dashboard of a motor vehicle.
Figure 2B:
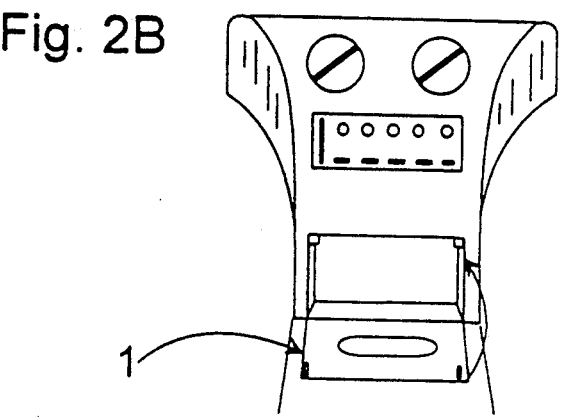
FIG. 2B is a perspective view of an alternative embodiment of the present invention depicted in FIG. 2A.

FIGS. 2A and 2B illustrate alternative placements of the tissue dispenser 1 in the dashboard of a motor vehicle. Preferably, the tissue dispenser 1 will be located adjacent to or above the glove compartment as depicted in FIG. 2A. This location, however, will depend upon the configuration and size of the motor vehicle dashboard. One such alternative placement is depicted in FIG. 2B.

Figure 3:
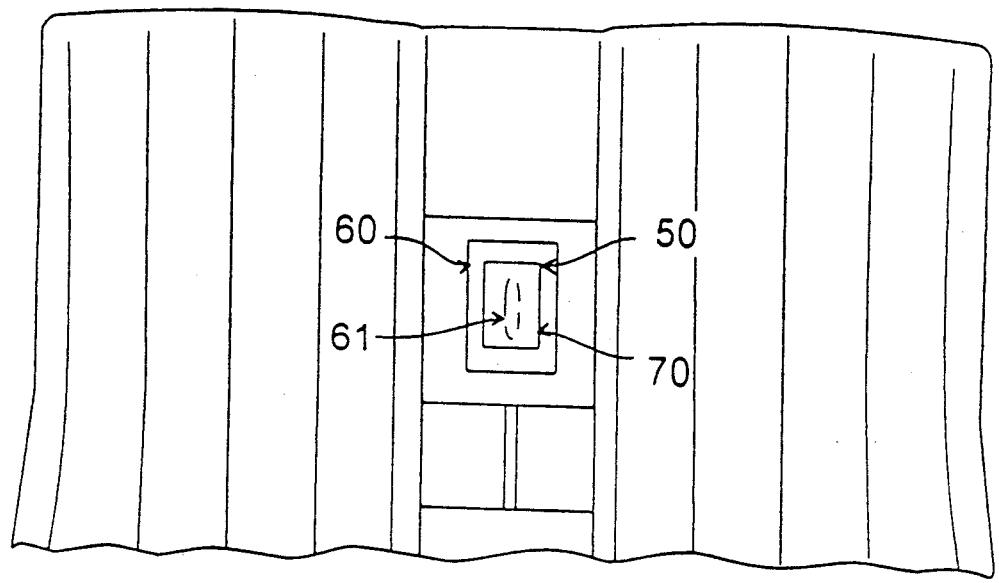
FIG. 3 is a perspective view showing the tissue dispenser of the present invention integrally molded with a passenger rear seat arm rest assembly of a motor vehicle.

FIG. 3 depicts the tissue dispenser as an integral part of a passenger rear seat arm rest assembly. In such a seat arm rest assembly, the arm rest may be pivoted downwardly for use by the rear seat passengers. When not in use, the arm rest may be pivoted upwardly into a recess so that the bottom face of the arm rest becomes a part of the faced portion of the back of the rear seat. The tissue dispenser 1 is molded into the recess that is exposed when the arm rest is pivoted downwardly for use by the rear seat passengers. This location provides convenience for the rear seat passengers and is easily accessible to young children. This location also has the added advantage of complete concealment of the tissue dispenser 1 when the arm rest is in its closed position flush against the back of the rear seat.

Figure 4A:
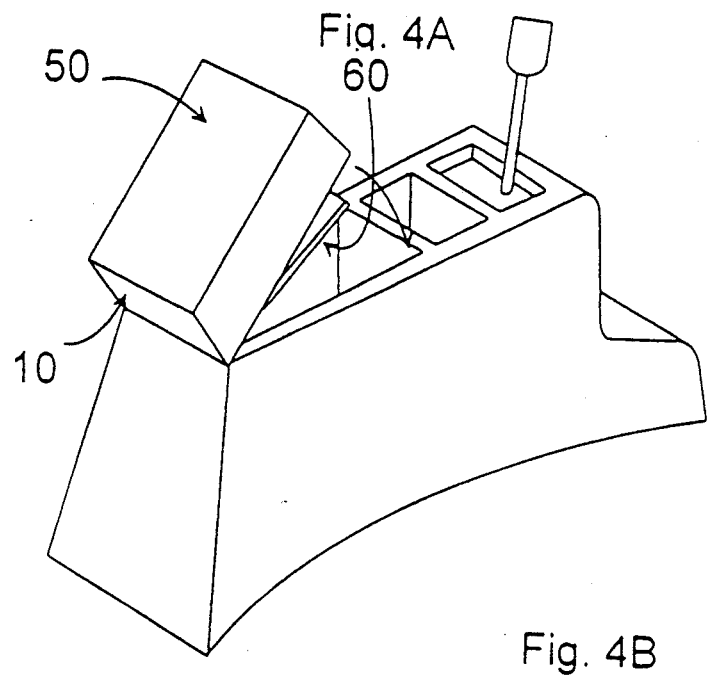
FIG. 4A is a perspective view, showing the tissue dispenser of the present invention integrally molded with a center console assembly of a motor vehicle.
Figure 4B:
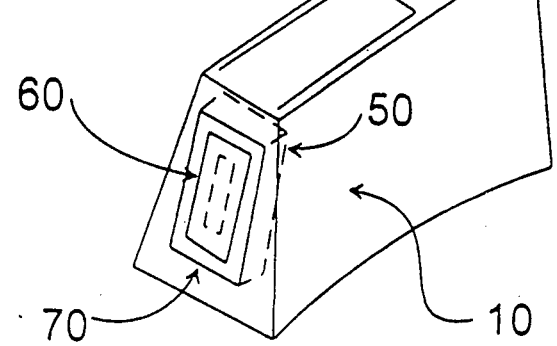
FIG. 4B is a perspective view of an alternative embodiment of the present invention depicted in FIG. 4A.

FIG. 4A and 4B show the tissue dispenser located in alternative placements in the center console assembly of a motor vehicle. as depicted in FIG. 4B, the tissue dispenser 1 may either be rearward facing in which case the tissue will be loaded from the top. In another embodiment as shown in FIG. 4A, the dispenser may also be located on the underneath side of the center compartment flap. This location would enable the tissues to be completely concealed.

Figure 5A:
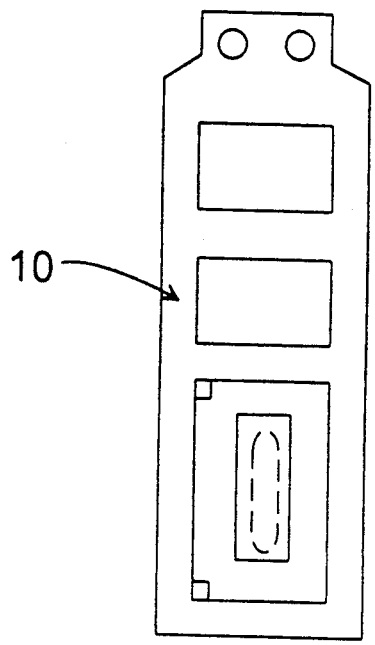
FIG. 5A is a perspective view, showing the tissue, dispenser of the present invention integrally molded with a overhead console assembly of a motor vehicle.
Figure 5B:
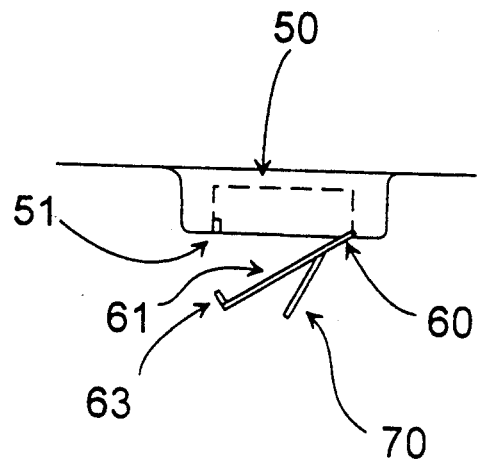
FIG. 5B is a side view of the tissue dispenser portion of the integrally molded tissue dispenser and overhead console depicted in FIG. 5A showing the operation of the tissue dispenser portion.

The tissue dispenser 1 may be integrally molded with a overhead console assembly as illustrated in FIGS. 5A and 5B. The tissue dispenser will accept the tissue box from, the rear end of the overhead console as depicted in FIG. 5B.

Figure 6:
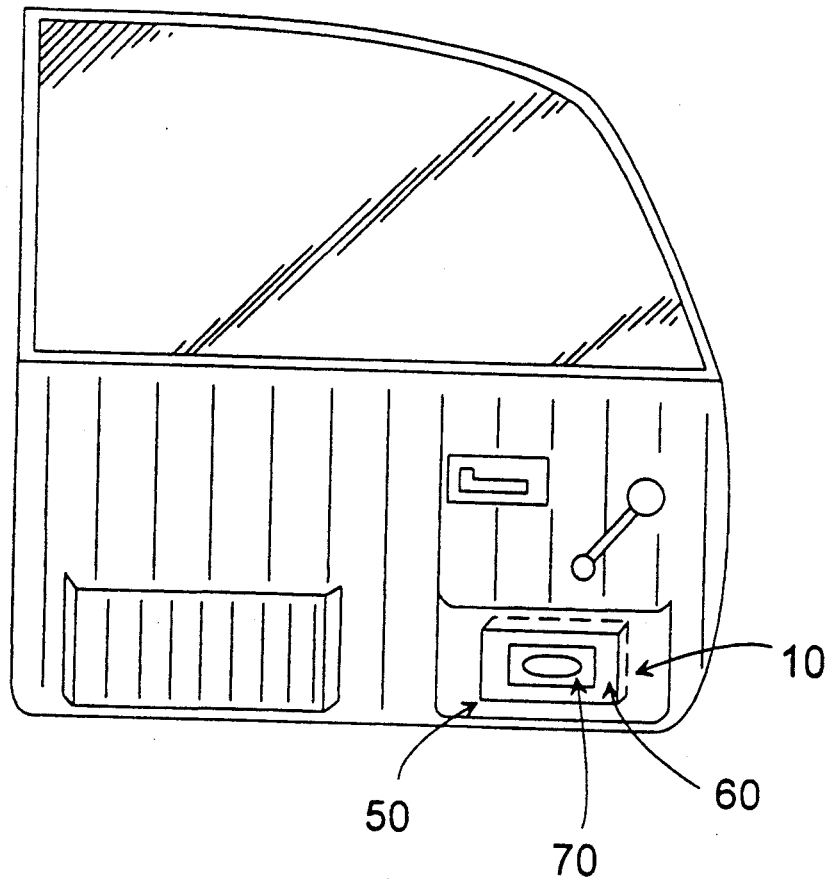
FIG. 6 is a perspective view showing the tissue dispenser of the present invention integrally molded with a door of a motor vehicle.

FIG. 6 shows the tissue dispenser 1 placed in the door of a motor vehicle. This location will allow for attachment to the door panel so as not to interfere with the window operation. In this location, this compartment can be alternately used by the driver side passenger for coins, hidden objects, and the like.

The integral nature of the tissue dispenser of the present invention allows formation and decoration of the dispenser in manners harmonizing with different styles of automotive interiors and designs. In particular, the tissue dispenser may be color blended to match the color of the motor vehicle interior.

In another embodiment of the present invention, the cover flap 70 of the tissue dispenser 1 may be covered with fabric to match the automotive interior upholstery. This may be done by any conventional means known in the automotive industry.

For those embodiments where there is no cover flap, the retainer flap 60 may be covered with fabric as described above.

While it is believed that from the foregoing description the nature and advantages of the invention will readily be apparent.

Changes in the form, proportion, and minor details of construction may be resorted to without departing from the spirit of the invention or exceeding the scope as set forth in the appended claims.

The foregoing is considered as illustrative only of the principles of the invention. Further, since numerous modifications, and changes will readily occur to those skilled in the art, it is not desired to limit the invention to the exact construction and operation shown and described, and accordingly all suitable modifications and equivalents, falling within the scope of the invention, may be resorted to.

I claim:

1. A tissue dispenser for a vehicle integrally molded in one piece with an interior trim piece permanently fixed to said vehicle so that said tissue dispenser forms an integral part of said interior trim piece, wherein said tissue dispenser is formed so that said tissue dispenser has a unitary one piece construction with said interior trim piece, said tissue dispenser of the interior trim piece comprising:
- a container portion for receiving tissues to be dispensed, said container portion being recessed with respect to said interior trim piece;
- a retainer flap portion for holding the tissues in place during the dispensing operation and substantially closing said container, said retainer flap portion containing an opening through which the tissues are dispensed;
- a first hinge means for attaching said retainer flap portion to said container portion, said retainer flap portion being substantially flush with said trim piece when said flap portion is in a closed position;
- a cover flap portion for removeably covering said opening in said retainer flap portion when tissues are not being dispensed; and
- a second hinge means for attaching said cover flap portion to said retainer flap portion;
wherein said container portion, said retainer flap portion, said first hinge means, said cover flap portion and said second hinge means are integrally molded in one piece with said interior trim piece.

2. The tissue dispenser of claim 1 wherein said attaching means comprises a flange portion.

3. The tissue dispenser of claim 1 further comprising means for releasably securing said retainer flap portion, wherein said means for releasably securing said retainer flap portion is integrally molded in one piece with said interior trim piece.

4. The automobile tissue dispenser of claim 1 wherein said interior trim piece is a dashboard trim piece.

5. The automobile tissue dispenser of claim 1 wherein said interior trim piece is a passenger seat arm rest trim piece.

6. The automobile tissue dispenser of claim 1 wherein said interior trim piece is a center console trim piece.

7. The automobile tissue dispenser of claim 1 wherein said interior trim piece is an overhead console trim piece.

* * * * *